United States Patent Office 2,716,618
Patented Aug. 30, 1955

2,716,618

PROCESS OF COLORING GLASS FABRICS

Richard W. Stenzel, Palos Verdes Estates, and Herman Plaut and George G. Buchanan, Los Angeles, Calif.

No Drawing. Application September 5, 1951,
Serial No. 245,256

5 Claims. (Cl. 117—65)

This invention relates to a method for imparting colors to glass fabrics, and is a continuation-in-part of our application, S. N. 77,674, filed February 21, 1949, now abandoned, entitled Coloring Glass Fabrics. These fabrics are very useful for certain industrial and decorative purposes, but it has in the past been difficult to color them satisfactorily, since the ordinary dyestuffs useful for cotton and other organic fabrics do not adhere well to the smooth glass surfaces of the fibers.

It is an object of this invention to impart to glass fabrics colors which will be permanent in the sense that they are fast to light, will not wash out in the conventional laundering operations, and will be resistant to scuffing.

Glass fabrics as presently available from the textile mills contain a sizing which tends to stiffen the material and which must be removed for many applications, especially where, as in decorative uses, a fine "hand" is desirable. This can be accomplished in various ways but the most effective is to burn off the sizing by means of a high temperature heat treatment. It is an object of this invention to combine such a heat treatment with a coloring process. Because of the relatively high temperatures involved (about 900° F. to 1200° F.) in this heat treating method, it is obvious that the usual organic dyestuffs will not be suitable as coloring agents, and it is a further object of this invention to use materials in the form of salts, oxides, bases, acids, etc. which by the heat treating process will deposit inorganic colored substances upon the glass fabric.

The above mentioned heat treatment, in addition to burning off the size, also "sets" the fibers so that they are permanently kinked or crimped, thereby preventing fraying and other undesirable characteristics. It is an object of this invention to produce a colored glass fabric in which the fibers are properly crimped and which has a good "hand" as compared to the untreated material.

For some purposes the glass fabric is, in addition to the heat treatment, subjected to a subsequent coating process, in which silicone oils such as methyl silicone, or still other substances, such as unsaturated chromium complexes, are applied to the fabric in order to improve it properties. It is an object of this invention to combine coloring steps with a heat treating step followed by another coating step to produce a superior colored fabric.

In general, our procedure contemplates the fixing upon glass fabrics of an inorganic water-insoluble colored substance which is produced by a reaction between two selected reactants separately deposited upon the fabrics by one or more heat treatment steps, and it is an object of this invention to produce a colored glass fabric in this manner. One of the embodiments of our invention contemplates a two-step procedure for depositing the color upon the cloth. It is an object of this invention to produce a colored fabric by precipitating upon the cloth an inorganic color material formed by subjecting the cloth to more than one heat-treating step in the presence of color-forming materials.

Further objects of the invention are to impart permanent colors to glass fabrics in a commercially feasible and economic manner, as will be evidenced by a description of the process infra.

We have found that in the process of depositing an inorganic pigmented material upon the surface of a glass fabric, good adhesion of the pigment to the glass fibers is obtainable if the final water-insoluble material has been deposited by the reaction of two dissolved substances with each other in successive steps.

The nature of our process is such that it is further essential that the first-deposited compound be rendered insoluble before the second compound is applied. This is most conveniently done by a heat treating step following the application of the first pigment to the glass fibers. An example of our process will illustrate the principles which we employ in our coloring procedure. If, for example, it is determined that a lead chromate pigment is desirably deposited upon the glass fibers, we first dip the cloth or coat it with a dilute solution of a lead salt such as lead nitrate, then remove the excess aqueous solution from the cloth by a blotting or squeezing action and finally subject the thus treated cloth to an elevated temperature which, in this case, is approximately 900° F. to 1200° F. In this way a water insoluble lead oxide is formed which is relatively tightly adherent to the glass surface. Subsequently, the cloth is passed through a second dilute solution of potassium dichromate and the excess of such solution is again removed and the fabric subjected to an additional heat treating step as before. In this way a tightly adherent lead chromate pigment is formed which, if the coloring process has been carefully conducted and the solutions are not too concentrated, will be fast to washing and to light. It has been our experience that if, for example, the order of applying the solutions is reversed, the precipitated color will not have the same degree of permanency. Furthermore, the potassium dichromate deposit even after heat treatment is water soluble so that when the fabric is dipped into the second solution containing lead nitrate some leaching action occurs and a non-uniform deposit results.

In general, we contemplate a procedure in which a dilute solution of one reactant is spread upon the glass fabric and then subjected to a heat treatment at a temperature between 900° F. and 1200° F., this treatment converting the soluble reactant to a water insoluble form either by severe dehydration or conversion to an insoluble oxide or other compound. The resulting fabric with its deposited reactant is then coated with a dilute solution of a second reactant capable of reaction with the first reactant to produce a highly insoluble pigment at the temperatures at which our process is conducted. It may at first seem unexpected that a reaction can be produced between a water insoluble material and one which is in the form of a dilute aqueous solution. However, the elevated temperatures apparently promote such reaction and the final product has the additional characteristic of being tightly adherent to the glass surface. This may be the result of some slight chemical action with the glass itself which, however, we are not able to substantiate.

It is of course well known that exposure of glass fabrics to high temperatures, especially above about 1200° F., can greatly deteriorate them, resulting in embrittlement, loss of strength, increased stiffness, etc. We therefore prefer to operate in the temperature range between 900° F. and 1200° F., and for the minimum time periods required to properly fix the coloring materials to the surface, thus avoiding impairment of the fiber properties. In many cases we can desirably combine the heat-treatment required to burn off the sizing and to crimp the fibers, with the heat-treatment of the fabric containing the first coloring ingredient. In this way we can reduce to a minimum the need for heating the fabric repeatedly to the higher temperatures, thereby avoiding damaging effects caused by excessive exposure to high temperatures for appreciable lengths of time. We have also found that in many cases it is possible to carry out the heat-treatment, involving burning off of the sizing and crimping the fibers, at somewhat lower temperatures when the fabric has first been coated with a solution containing a coloring ingredient than if the heat-treatment is carried out in the absence of such a material. This possible reduction in temperature is of considerable advantage because it results in less deterioration of the fibers.

The precise temperatures to be used in our process will vary somewhat with the nature of the pigmenting materials used, but in general we find that it is desirable to heat the fabric in each treating step in the range of 900° F. to 1200° F. in order to deposit the material in such form that tight adhesion to the glass surface results, while at temperatures lower than 900° F. we usually find that the precipitated color tends to be chalky and poorly adherent. In addition to the temperature, the time of exposure of the cloth in the heating zone is also important and we find that exposures of the fabric to 1200° F. should not exceed about 10 seconds, if serious deterioration of the fiber properties is to be avoided. At the lower temperatures longer exposures are permissible. In practicing our process, we prefer to operate under such time and temperature conditions that the properties of the glass fabric are not greatly deteriorated and in no case do we wish to produce a fabric having less than 30% of its initial strength.

We have found that it is quite important to make certain that the dilute solutions of reactants applied to the glass cloth thoroughly wet the fabric and penetrate into the fine interstices between the fibers. Quite often the cloth has upon it residual organic matter which militates against adequate penetration and it is then necessary to employ a wetting agent to assist in the penetration process. We have found that the most effective of such agents are the water soluble members of the class of long chain fatty acid partial esters of hexitol anhydride and their polyoxalkylene derivatives. These substances have been found to be much effective for this purpose than others we have tried and which are normally recommended for detergent action in common non-vitreous fabrics. We normally require a concentration of only about .1% to .5% of such a wetting agent to impart adequate penetration of the solutions into the glass fibers.

So far as the ingredients of the solutions applied to the glass fabric are concerned, the above description illustrates our guiding principles. In general, we wish to treat the cloth successively with solutions which, when mixed, will produce an insoluble precipitate, exemplified above by lead chromate. In the second heat-treatment the chromate is thoroughly dehydrated and fixed to the fibers. In a quite analogous manner, other chromates can be precipitated to obtain various color effects, e. g., barium chromate, giving a yellow color, can be precipitated by using barium nitrate in place of lead nitrate indicated. Similarly, other combinations of solutions which, upon mixing, produce an insoluble precipitate that will result in a stable color residue upon heating to the temperature range of 900° F. to 1200° F., are suitable for our purposes.

As has been indicated, the precise temperatures to which the fabric and its associated coloring solution are to be heated, are determined primarily by the character of the color-imparting ingredients used. In the example cited, both the potassium dichromate and the lead chromate have high decomposition temperatures, so that the higher of the temperatures, as indicated, are permissible. In other cases, the temperatures must be kept below the decomposition points of the materials used, but we find that it is advantageous to carry the heat treatment as close to such decomposition temperatures (but not exceeding about 1200° F.) as possible in order to obtain the desired adhesion of the pigment to the glass surface. In general, we have found that the compounds with decomposition temperatures below about 900° F. do not form a suitable, adherent pigment on the glass surfaces.

In order to effect a through and uniform deposit of the coloring ingredients upon the fabric surface, we prefer to apply them in the form of dilute solutions. These may be slightly basic or acid in character, but we wish to avoid strongly acid or basic substances since we have found that these materials tend readily to deteriorate the fibers during the heat treatment. In the case of aqueous solutions, they preferably should not have pH values below 3 or above 10.

We prefer to use comparatively dilute solutions of the coloring ingredients and to provide a means, either by natural drainage or by wiping or blotting action, for removing the excess solution before the fabric is introduced into the heating zone. If solutions more concentrated than about 5% are used, an excessive amount of material will be deposited upon the fabric, resulting not only in appreciable stiffening effects, but also favoring a chalky deposit of the pigment which may then be easily rubbed off. Solutions as low as 0.5% may be used where low intensity colors are desired, whereas the more concentrated solutions containing several percents of the coloring ingredients will produce the more intense colors. It is desirable that the amounts of the coloring ingredients successively deposited upon the cloth be in approximately stoichiometric proportions, since otherwise the unreacted residue may be easily washed out in laundering operations. It is not possible to predetermine the exact concentrations which will produce a minimum amount of unreacted ingredients on the cloth, because of differences in specific gravity of the solutions, their ability to wet the cloth, and the capacity of the cloth itself to retain excessive liquid. The determination of these factors is therefore best left to experimental determination for the particular system involved.

In some cases we prefer to apply the coloring solutions and accompanying heat treatments to a cloth which has previously been subjected to a heat treatment for burning off organic size, as previously mentioned. While this requires subjecting the fabric to an additional heat treatment, we find that in some cases a slightly brighter color is produced than when the raw untreated fabric is used, but whenever possible we prefer to keep the number of heating cycles to a minimum.

There are, of course, many water soluble materials which will produce pigments in the manner exemplified above with lead nitrate and potassium dichromate. The principal requirements are that the material whose solution is first spread upon the cloth will be converted by the heat treatment to a water insoluble compound and that the second material whose solution is spread upon the fabric be capable of metathetical reaction with the first material to produce a water insoluble colored pigment. The critical characteristics as outlined can readily be obtained from handbook tables without experimentation on the part of the public and we therefore do not wish to be limited to the example which we have cited.

As previously mentioned, it is often desirable to subject the cloth upon which the color has been deposited to a final treatment designed to give an improved "hand" or "feel" to the material. This is readily accomplished by coating the fabric with an emulsion of a silicone oil, such as methyl silicone, and then subjecting it to a temperature of about 500° F. for a short period. This not only produces an improved "hand," but also tends to increase fastness of color, there being apparently some inter-action between the silicone, the glass fibers and the colored pigment during the heat-treating period.

We claim as our invention:

1. A process of coloring glass fabrics comprising treating the fabric with an aqueous metallic salt solution, heating the treated fabric to a temperature between 900° F. and 1200° F., to thereby form a layer of an oxide of said metal adhering to the glass surface, cooling the fabric, treating said coated fabric with a second solution containing an anion capable of reacting with said metal oxide to form a colored compound, and heating said treated fabric at a temperature between 900° F. and 1200° F., to thereby form the colored compound adhering to said glass fabric.

2. The process as described in claim 1, in which the amount of the anion of the second solution deposited upon the fabric is substantially chemically equivalent to the amount of oxide formed on the fabric by treatment with the first solution.

3. The process as described in claim 1 in which the solutions used to treat the fabric contain a wetting agent selected from the class of water-soluble members of long chain fatty acid partial esters of hexitol anhydride and their polyoxyalkylene derivatives.

4. The process as described in claim 1 in which the pH of the said solutions is between 3 and 10.

5. The process as described in claim 1 in which the concentration of the pigmenting materials in the solutions is in the range of 0.5 and 5 weight percent.

References Cited in the file of this patent

UNITED STATES PATENTS

| | | |
|---|---|---|
| 1,450,330 | Negbaur | Apr. 3, 1923 |
| 2,245,783 | Hyde | June 17, 1941 |
| 2,353,930 | Smith | July 18, 1944 |
| 2,433,292 | Perloff | Dec. 23, 1947 |

OTHER REFERENCES

Atlas Spans & Tweens, Atlas Powder Co. (only pages 1 and 2 relied on).